United States Patent
Kohara et al.

[11] Patent Number: 5,130,831
[45] Date of Patent: Jul. 14, 1992

[54] PARTICULATE SPACERS AND LIQUID CRYSTAL DISPLAY CELLS CONTAINING THESE SPACERS

[75] Inventors: Minoru Kohara, Kyoto; Kazuo Saiuchi, Ohtsu; Kazuhiko Kanki, Uji; Hisayuki Matsuda, Nagaokakyo; Shinzo Yamada, Jyoyo; Kunikazu Yamada, Shiga, all of Japan

[73] Assignee: Sekisui Kagaku Kogyo Kabushiki Kaisha, Osaka, Japan

[21] Appl. No.: 532,406

[22] Filed: Jun. 4, 1990

[30] Foreign Application Priority Data

Mar. 27, 1990 [JP] Japan .................... 2-80428

[51] Int. Cl.$^5$ .................................. G02F 1/13
[52] U.S. Cl. .......................... 359/81; 359/80; 430/20; 428/1
[58] Field of Search .............. 350/334, 343, 344; 427/195, 213.33, 218, 221; 359/74, 80, 81; 428/1; 430/20

[56] References Cited

U.S. PATENT DOCUMENTS 4,165,157  8/1979  Kobale et al. .................. 350/344
4,685,770  8/1987  Baeger ........................... 350/344

FOREIGN PATENT DOCUMENTS

| 2854175 | 6/1979 | Fed. Rep. of Germany ...... 350/344 |
| 57-13424 | 1/1982 | Japan ................. 350/344 |
| 57-29031 | 2/1982 | Japan ................. 350/344 |
| 57-189117 | 11/1982 | Japan . |
| 59-24829 | 2/1984 | Japan . |
| 60-257426 | 12/1985 | Japan ................. 350/344 |
| 62-296122 | 12/1987 | Japan . |
| 63-52120 | 3/1988 | Japan ................. 350/344 |
| 63-94224 | 4/1988 | Japan ................. 350/344 |
| 63-113424 | 5/1988 | Japan ................. 350/344 |
| 63-172123 | 7/1988 | Japan ................. 350/344 |
| 63-200126 | 8/1988 | Japan . |

Primary Examiner—Rolf Hille
Assistant Examiner—Minhloan Tran
Attorney, Agent, or Firm—Armstrong, Nikaido, Marmelstein, Kubovcik & Murray

[57] ABSTRACT

A particulate spacer for use in a liquid crystal display cell, electrochromic display device, or the like is provided. The particulate spacer comprises a core particle and a functional layer formed on the surface of the core particle.

10 Claims, 1 Drawing Sheet

PARTICULATE SPACERS AND LIQUID CRYSTAL DISPLAY CELLS CONTAINING THESE SPACERS

BACKGROUND OF THE INVENTION

1. Field of the Invention

The present invention relates to particulate spacers for use as spacers in liquid crystal display cells, spacers in electrochromic display devices, or other spacers for maintaining a constant distance between films, sheets or blocks. The present invention also relates to liquid crystal display cells employing such particulate spacers.

2. Description of Prior Art

Liquid crystal display cells have a pair of transparent substrates with electrodes, a spacer which maintains the two substrates at a constant distance, a liquid crystal composition placed between the two substrates and a sealing material for sealing the periphery of the gap space between the two substrates. Since a fixed gap must be maintained between the pair of substrates in the liquid crystal display cell, organic or inorganic solid particles of nearly constant diameter are placed between the two substrates at prescribed intervals as spacers. Examples of this type of particles are disclosed in Japanese Laid-Open Patent Publications No. 57-189117, 59-24829, 62-296122 and 63-200126.

However, in conventional liquid crystal display cells, these particles are not fixed to the substrates, and consequently the following shortcomings arise.

(1) Air blown onto the substrates in the process of assembling the liquid crystal display cell may cause scattering of particulate spacers, resulting in loss of the spacers.

(2) The particulate spacers may be shifted on the surface of the substrates in the process of injecting liquid crystal composition into the liquid crystal display cell.

(3) The particulate spacers may be displaced by the electrical or hydrodynamic forces arising while the liquid crystal display cell is in operation.

Elimination of these shortcomings requires that the particulate spacers be fixed to the substrates.

Furthermore, because the particulate spacers used in the conventional liquid crystal display cells cannot shield light, a high-contrast display cannot be obtained in the liquid crystal display cells. Therefore, colored particulate spacers that can shield light have been examined. Colored particles may be used as such particulate spacers, as desired. The following methods have formerly been proposed for the purpose of preparing colored particles.

1) A pigment is dispersed in a monomer, and polymerization is carried out, resulting in colored particles.

2) An oil-soluble dye is dispersed or dissolved in a monomer and polymerization is carried out, resulting in colored particles.

3) A reactive dye, formed by introducing polymerizable unsaturated groups into certain dye molecules, is subjected to copolymerization.

4) Colorless particles are produced first, and these particles are then colored with dyes.

However, as regards the aforementioned method 1, the uniform dispersion of the pigment in the monomer is difficult, and consequently uncolored transparent particles are also formed.

As regards the aforementioned method 2, the solvent tolerance of the colored particles so obtained is poor. Moreover, the dye may be decolorized by the polymerization catalyst. Furthermore, since dyes possess polymerization inhibiting properties, the monomer in such a mixture cannot be completely polymerized in some cases.

As regards the aforementioned method 3, since a reactive dye is used as one of the initial raw materials, the choice of initial raw materials is correspondingly restricted. Moreover, the resulting polymer does not possess a high degree of polymerization.

As regards the aforementioned method 4, particles dyed to a deep coloration are not obtained. Moreover, the dye easily dissociates from the resulting colored particles if these particles are in contact with organic solvents.

SUMMARY OF THE INVENTION

The particulate spacer of this invention, which overcomes the above-discussed and numerous other disadvantages of the prior art, comprises a core particle and a functional layer formed on the surface of the core particle.

In a preferred embodiment, the functional layer is made of a hot-melt adhesive resin.

In a preferred embodiment, the functional layer is made of an epoxy resin.

In a preferred embodiment, the core particle is colored.

In a preferred embodiment, the above-mentioned particulate spacer further comprises an intermediate layer made of titanium oxide polymer, the intermediate layer being disposed between the surface of the core particle and the functional layer.

In a preferred embodiment, the core particle is made of a cross-linked resin and the functional layer is a color layer which is formed by treatment of the core particle with an acidic treating agent and then with a basic dye.

A method for the production of particulate spacers of this invention comprises the steps of : treating core particles with an organic titanate compound to form an intermediate layer on the surface of each of the core particles, the intermediate layer being made of titanium oxide polymer; and dispersing the treated core particles into a solution or emulsion of a hot-melt adhesive resin or epoxy resin to form a functional layer on the intermediate layer thereof.

Another method for the production of particulate spacers of this invention comprises the steps of: forming core particles made of a polymer which is prepared from a monomer mixture containing ethylenically unsaturated monomers; treating the core particles with an acidic treating agent; and dyeing the treated core particles to form a color layer on the surface thereof.

.The liquid crystal display cell of this invention comprises: a pair of substrates having an electrode on the surface thereof, at least one of which is transparent, the substrates being disposed at a constant gap so that the respective electrodes of the substrates face to each other; a sealing material filling the peripheral portion of the gap between the substrates; particulate spacers dispersed in the gap space between the substrates to maintain a constant gap between the substrates, each of the particulate spacers having a core particle and a functional layer formed on the surface of the core particle; and a liquid crystal composition filling the gap between the substrates.

A method for the production of a liquid crystal display cell of this invention comprises the steps of: dispersing particulate spacers over the surface of a first substrate, each of said particulate spacers having a core particle and a functional layer formed on the surface of said core particle; placing a second substrate above said first substrate so as to interpose said particulate spacers therebetween; sealing the peripheral portion of the gap between the first and second substrates with a sealing material except for an orifice for the injection of a liquid crystal composition; and injecting the liquid crystal composition through said orifice. In the above-mentioned process, instead of being injected through the orifice, the liquid crystal composition can be applied on the first substrate on which the particulate spacers have been dispersed. In this case, the second substrate is then placed on the first substrate, and the entire peripheral portion of the gap between the first and second substrate is sealed, resulting in a liquid crystal display cell.

In a preferred embodiment, the method comprises the steps of: dispersing particulate spacers over the surface of a first substrate, each of the particulate spacers having a core particle and a functional layer formed on the surface of the core particle; pressing the particulate spacers onto the first substrate with a pressing means to ensure the adhesion of the particulate spacers to the first substrate; detaching the pressing means from the particulate spacers; placing a second substrate above the first substrate so as to interpose the particulate spacers therebetween; and sealing the peripheral portion of the gap between the first and second substrates with a sealing material.

In a preferred embodiment, the functional layer formed on the surface of the core particle of the particulate spacer used for the liquid crystal display cell is made of a hot-melt adhesive resin.

In a preferred embodiment, the functional layer formed on the surface of the core particle is made of an epoxy resin.

In a further preferred embodiment, the core particle is made of a cross-linked resin and the functional layer is a color layer which is formed by treatment of the core particle with an acidic treating agent and then with a basic dye.

Thus, the invention described herein makes possible the objectives of : (1) providing particulate spacers for liquid crystal display cells, said particulate spacer having the ability to adhere to the substrates and therefore being not scattered from or shifted on the substrate surfaces; (2) providing particulate spacers which can securely maintain a nearly constant gap between a pair of substrates and thereby obtaining a liquid crystal display cell of high quality; (3) providing particulate spacers comprising solid core particles with a surface layer of resin which do not peel away from the said solid core particles; (4) providing particulate spacers, which do not cohere or aggregate with each other; (5) providing particulate spacers comprising a thin uniform functional layer of hot-melt adhesive resin or epoxy resin formed on the surfaces of the core particles; (6) providing particulate spacers which are colored deeply and uniformly; (7) providing colored particulate spacers the color of which does not fade; (8) providing a high-contrast and high-performance liquid crystal display cell; and (9) providing a liquid crystal display cell having a pair of substrates, the gap therebetween having the ability to be kept at a constant rate with precision.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Core Particles

Figure 1:
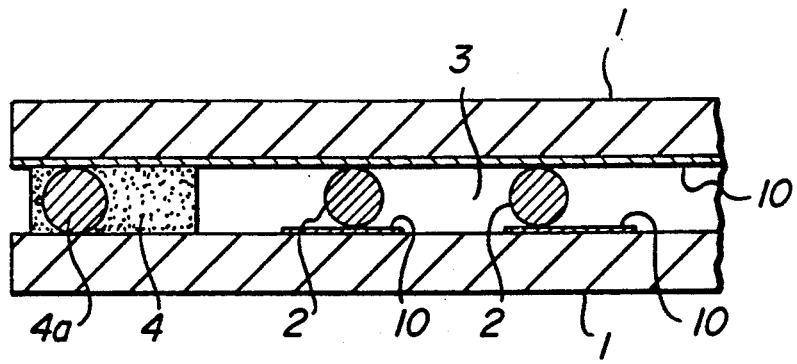
FIG. 1 shows an enlarged partial sectional view of the liquid crystal display cell of the present invention.
Figure 2:
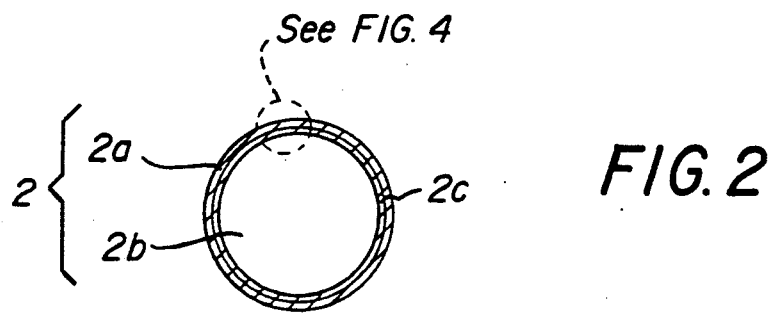
FIG. 2 shows an enlarged cross-section of the particulate spacer of the present invention.
Figure 3:
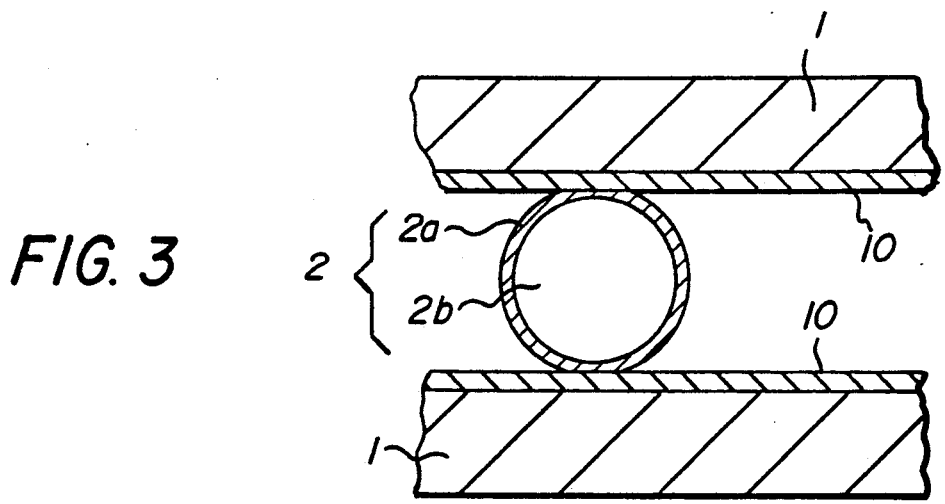
FIG. 3 shows an enlarged partial sectional view of the liquid crystal display cell of the present invention.
Figure 4:
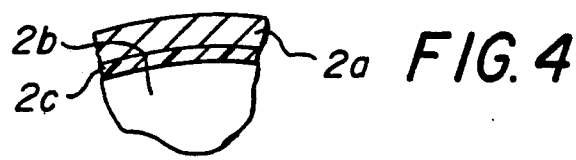

The core particles used in the present invention are solid particles made of resin or inorganic substance.

The types of resins suitable for the formation of such particles include the following; thermoplastic resins such as polyethylene, polypropylene, polymethylpentene, polyvinyl chloride, polytetrafluoroethylene, polystyrene, polymethyl methacrylate, polyethylene terephthalate, polybutylene terephthalate, polyamides, polyimides, polysulfone, polyphenyleneoxide, polyacetal; and thermosetting resins such as epoxy resins, phenol resins, melamine resins, unsaturated polyester resins, polydivinylbenzene, divinylbenzene-styrene copolymer, divinylbenzene-acrylate copolymers, polydiallylphthalate, polymer of triallyl isocyanurate, polymer of benzoguanamine, etc.

Among the aforesaid resins, those especially desirable for the formation of the core particles are melamine resins, divinylbenzene-styrene copolymer, divinylbenzene-acrylate copolymers, polydiallylphthalate, etc.

Moreover, the types of inorganic substances suitable for the formation of such core particles include the following: silicate glass, borosilicate glass, lead glass, soda-lime glass, alumina, alumina silicate, etc. Among these, silicate glass and borosilicate glass are especially suitable for the present purpose.

The shapes of the core particles are not restricted. However, particles of spherical, ellipsoidal or cylindrical shapes with the following dimensions are most suitable. For spherical particles, diameters in the range of 0.1 $\mu$m to 1000 $\mu$m are appropriate, and those in the range of 1 $\mu$m to 100 $\mu$m are especially desirable. For ellipsoidal particles, short-axis diameters in the range of 0.1 $\mu$m to 1000/$\mu$m are appropriate, and those in the range of 1 $\mu$m to 100 $\mu$m are especially desirable, while the ratio of long to short axis diameters should be in the range of 1 to 10, and more preferably in the range of 1 to 5. For cylindrical particles, diameters in the range of 0.5 /$\mu$m to 1000/$\mu$m are appropriate, and those in the range of 3 $\mu$m to 100,/$\mu$m are especially desirable, while the ratio of the length to the diameter of the cylinders should be in the range of 1 to 50, and more preferably 1 to 10. Ordinarily, the core particles used for the purposes of the present invention are of the types which are generally used for spacers for liquid crystal display cells, particles for labeling purposes, standard particles for various measurements, carriers for diagnostic tests, etc.

The core particles are colored, as desired. In the case of resin particles, the coloring methods appropriate for use in obtaining the colored core particles include the following:

(1) Colorless core particles are treated with disperse dyes, acidic dyes or basic dyes;

(2) Carbon black or a metal oxide is mixed with monomers, and a polymerization reaction is carried out, resulting in colored resin particles; and (3) Carbon black or a metal oxide is blended with a polymer, and formed into resin particles.

In the case of core particles made of inorganic substances, a coloring method appropriate for use in obtaining the colored core particles includes the process of forming resin films on the surfaces of the inorganic particles, and then coloring these coated particles by decomposition or carbonization at high temperatures. Also, in cases where the material used for the formation of the particles is itself colored, the particles can, of course, be used without any particular additional coloring treatment.

Titanium Oxide Polymer Layer

The particulate spacer of the present invention comprises, if necessary, an intermediate layer made of titanium oxide polymer between the surface of the core particle and the functional layer. Especially, when the functional layer is made of a hot-melt adhesive resin or epoxy resin, the titanium oxide polymer layer increases the adhesion between the core particle and the functional layer, and a uniform and thin functional layer can be formed on the titanium oxide polymer layer.

The following method, for example, can be employed for the formation of the said titanium oxide polymer layer on the surfaces of the core particles. First, an organic titanium compound (i.e., an alkoxide containing titanium) is dissolved in an appropriate solvent, and the solution so obtained is applied onto the surfaces of the core particles, after which the said organic titanium compound is hydrolyzed to form the desired titanium oxide polymer layer.

The organic titanium compounds applicable for the present purpose include, for example, titanium tetraethoxide ($Ti(OC_2H_5)_4$), titanium tetrapropoxide ($Ti(OC_3H_7)_4$), titanium tetrabutoxide ($Ti(OC_4H_9)_4$), titanium tetrapentoxide ($Ti(OC_5H_{11})_4$), titanium tetrahexoxide ($Ti(OC_6H_{13})_4$), titanium tetrakis(2-ethylhexoxide) ($Ti[OCH_2CH(C_2H_5)C_4H_9]_4$), titanium tetradodecyloxide ($Ti(OC_{12}H_{25})_4$), titanium tetrastearoxide ($Ti(OC_{17}H_{35})_4$), titanium dipropoxide bis(acetylacetonate) ($Ti(OC_3H_7)_2[OC(CH_3)CHCOCH_3]_2$), titanium dibutoxide bis(triethanolaminate) ($Ti(OC_4H_9)_2[OC_2H_4N(C_2H_4OH)_2]_2$), titanium dihydroxide bis(lactate) ($Ti(OH)_2[OCH(CH_3)COOH]_2$), titanium propoxyoctylene glycolate ($Ti[OCH_2CH(C_2H_5)CH(C_3H_7)OH]_4$), etc. Among these, the compounds particularly desirable for the present purpose are titanium tetrapropoxide, titanium tetrabutoxide, titanium tetrakis(2-ethylhexoxide), titanium dipropoxide bis(acetylacetonate) and titanium dibutoxide bis(triethanolaminate).

Examples of the solvent in which the organic titanium compound is dissolved include n-hexane, cyclohexane, benzene, toluene, trichlorethylene and Freon-113.

An appropriate method for applying the aforesaid organic titanium compounds onto the surfaces of the core particles includes the process of immersing the core particles in the aforesaid solution and evaporating the solvent while thoroughly mixing the ingredients. After evaporation of the solvent, heating at a temperature of 60° to 100° C. may be desirable in some cases.

It is presumed that the organic titanium compound applied on the surfaces of the core particles in the above-described manner reacts with the moisture in the ambient air, thereby undergoing hydrolysis and subsequent polycondensation. The polycondensation product (i.e., titanium oxide polymer) has the following formula:

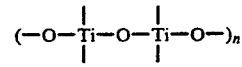

wherein n is an integer

The amount of titanium oxide polymer in the layer formed on the surfaces of the core particles, expressed in terms of weight of titanium, should preferably be in the range of 0 mg–500 mg, more preferably, 0.01 mg–500 mg, and still more preferably, 30 0.1 mg–100 mg, per square meter of surface area of the core particles. If the amount of the titanium oxide polymer layer, expressed in terms of weight of titanium, were greater than 500 mg per square meter of surface area of the core particles, then various undesirable results would occur, such as the decrease of electrical resistance of the particulate spacers to be obtained.

Because the wettability of resin to the titanium oxide polymer layer is excellent, the resin can be coated on the titanium oxide polymer layer in the form of a thin layer. Thus, the resulting coated particles are not susceptible to aggregation, and moreover, the resin layer can be formed with good adhesion to the particle surfaces.

Functional Layer

The functional layer formed on the surface of the core particle is made of a hot-melt adhesive resin or epoxy resin. Alternatively, the functional layer is a color layer which is formed by treatment of the core particle with an acidic treating agent and then with a basic dye.

Functional layer made of hot-melt adhesive resins

The hot-melt adhesive resin melts and displays adhesive properties when heated at a specific temperature. The hot-melt adhesive resin is chosen so that the melting temperature of this hot-melt adhesive resin is lower than the softening temperature or decomposition temperature of the core particles. The desirable melting temperature of the said hot-melt adhesive resin is in the range of 85° C.–200° C., or more desirably 90° C.–170° C., while the thickness of the functional layer of the hot-melt adhesive resin should desirably be in the range of 0.01 μm–100 μm.

The hot-melt adhesive resins appropriate for use in the process of the present invention are as follows.
(A) Polyolefines Waxy polyethylene, oxidized waxy polyethylene, low-density polyethylenes, high-density polyethylenes, oxidized polyethylene, ethylene-vinyl acetate copolymer, ethylene-vinyl acetate-carbon monoxide terpolymer, ethylene-acrylic acid copolymer, ethylene-acrylate copolymers, ethylene-vinyl acetate copolymers containing carboxyl groups such as ethylene-vinyl acetate-acrylic acid terpolymer, ethylene-vinyl acetate-vinyl alcohol terpolymer, ethylene-sulfur oxide copolymer, sulfonated polyethylenes, ethylene-propylene copolymer, polypropylene, hydrogenated polybutadiene, hydrogenated polyisoprene, hydrogenated butadiene-styrene block copolymer, hydrogenated isoprene-styrene block copolymer, oxidized substance of these materials and ethylene-maleicanhydride copolymer.

(B) Other types of resins

Polymethylacrylate, polyethylacrylate, polybutylacrylate, polybutadiene, polyisoprene, polyamides, polyurethanes, polyesters, polyimides, polyvinyl acetal, polyvinyl butyral, butadiene-styrene random copolymers, butadiene-styrene block copolymer and isoprene-styrene block copolymer, etc.

The desirable among the types of resins indicated in (A) and (B) above are the polyolefines listed under (A), the particularly preferable varieties being waxy polyethylene or oxidized substance thereof, ethylene-vinyl acetate copolymer or oxidized substance thereof, and ethylene-vinyl acetate copolymers containing carboxyl groups. These resins have comparatively low melting points or softening temperatures, and consequently the desired adhesion to the substrates is readily obtained if particles coated with these resins are used as spacers in liquid crystal display cells. Moreover, although the adhesiveness of the aforesaid resins is inferior to that of certain other resins such as polyamides, their polarity is low, therefore particles coated with the resin do not derange the orientation of the liquid crystal composition when the coated particles are used as spacers in liquid crystal display cells.

The following two methods (1) and (2) can be employed for forming hot-melt adhesive resin layers upon the core particle surfaces using the above-mentioned hot-melt adhesive resins.

(1) First, the hot-melt adhesive resin is dissolved in a suitable solvent, i.e., a solvent in which the said resin is adequately soluble and which is immiscible with water (The varieties of the solvent will be described below). Next, this resin solution is added to a suitable amount of water containing a surfactant and emulsified by agitation. The size of the emulsified globules in this emulsion should desirably be 1 μm or smaller.

Then, the aforesaid core particles are added to this emulsion and suspended in the emulsion by vigorous agitation. Then, while maintaining this suspended state, the suspension is gradually cooled to a temperature below the temperature at which the resin is deposited on the core particles. Alternatively, a precipitant is gradually dripped into the suspension. The precipitant is miscible with the said solvent and lowers the solubility of the hot-melt adhesive resin in the solvent. The varieties of the solvent will be described below. It is effective to employ the process of dripping the precipitant into the suspension while simultaneously lowering the temperature of the suspension.

In the above process, the concentration of the hot-melt adhesive resin in the initial resin solution should desirably be in the range of 0.1 to 20% by weight.

The amount of the core particles added should preferably not exceed 100 g per liter of the aforesaid emulsion. The applicable surfactants include polyoxyethylene alkyl phenyl ethers, polyoxyethylenepolyoxypropylene block polymer, sorbitan esters, glycerin esters, alkylbenzenesulfonic acids, etc. If a polyoxyethylene alkyl phenyl ether is used as the surfactant, then the amount of this surfactant should desirably be in the range of 0.01 g to 0.5 g per 100 ml of water. The ratio of the aqueous surfactant solution to the said resin solution should be in the range of 50:1 to 1:5 by volume, or still more preferably from 20:1 to 3:1 by volume.

When the temperature of the system is reduced in the above-described process, the initial liquid temperature should desirably be 60° C.–100° C., while the final temperature after cooling should desirably be 0° C.–50° C. The rate of temperature reduction should preferably be in the range of 0.01° C./min and 10° C./min. Moreover, if a precipitant is added during the above process, then the said precipitant should preferably be added at a rate of 0.01 ml/min to 1 ml/min.

When the aforesaid process is completed, the functional layer made of the hot-melt adhesive resin is formed onto the surface of the core particles. Next, the mixture is filtered or centrifuged in order to separate these coated particles from the system, then the obtained particles are washed with a suitable detergent and, if necessary, dried by heating, thereby obtaining the desired particulate spacers.

(2) After dissolving the hot-melt adhesive resin in a suitable solvent, the aforementioned core particles with a surface layer of titanium oxide polymer are added and suspended in the solution by vigorous agitation. Then, while maintaining this suspended state, the said suspension is gradually cooled to a temperature below the temperature at which the resin is deposited on the core particles. Alternatively, a precipitant is gradually dripped into the suspension. The precipitant is miscible with the said solvent and lowers the solubility of the hot-melt adhesive resin in the solvent. The varieties of the solvent will be described below. It is effective to employ the process of dripping the precipitant into the suspension while simultaneously lowering the temperature of the suspension.

In the above process, the concentration of the hot-melt adhesive resin in the initial resin solution should desirably be in the range of 0.1 to 20% by weight.

Also, the amount of titanium oxide polymer-coated particles added per liter of the aforesaid emulsion should preferably not exceed 100 g. If the temperature of the system is reduced in the above-described process, then the initial temperature should be from room temperature to 200° C., while the final temperature after cooling should desirably be from −30° C. to 50° C. The rate of temperature reduction should preferably be in the range of 0.01° C./min to 10° C./min. Moreover, if a precipitant is added during the above process, then the said precipitant should preferably be added at a rate of 0.01 ml/min to 1 ml/min.

When the aforesaid process is completed, the functional layer made of the hot-melt adhesive resin is formed onto the surface of the core particles. Next, the mixture is filtered or centrifuged in order to separate these coated particles from the system, then the obtained particles are washed with a suitable detergent and, if necessary, dried by heating, thereby obtaining the desired particulate spacers.

In the aforesaid methods of manufacture (1) and (2), the solvents suitable for dissolving the hot-melt adhesive resin include benzene, toluene, xylene, ethylbenzene, cyclohexylbenzene, diethylbenzene, styrene, chlorobenzene, dichlorobenzene, trichlorobenzene, chlorotoluene, chloronaphthalene, pentanone, hexanone, cyclohexanone, heptanone, isophorone, acetophenone, etc. Benzene, toluene and xylene are particularly suitable as solvents for this purpose.

Precipitants appropriate for use in the above-described process include methanol, ethanol, isopropanol, methyl ethyl ketone, ethyl acetate, tetrahydrofuran, etc. Methanol, ethanol and isopropanol are particularly suitable as precipitants for this purpose.

Also, after the formation of hot-melt adhesive resin layers on the surfaces of the particles, cross-linking may, if necessary, be induced by a method such as irradiation or post-heating, etc.

Functional layer made of epoxy resins

Epoxy resin layers formed on the surfaces of the core particles melt and then harden, and display adhesive properties when heated at a specific temperature. The thickness of this epoxy resin layer should desirably be in the range of 0.01 μm to 100 μm.

The epoxy resin composition used for the particulate spacers of this invention ordinarily comprises an epoxy resin and a hardener. The types of epoxy resins applicable to the purpose of the present invention include bisphenol A type epoxy resin (shown in formula I), which is obtained by the reaction between bisphenol A and epichlorohydrin, bisphenol F type epoxy resin (shown in formula II), which is obtained by the reaction between bisphenol F and epichlorohydrin, bisphenol AD type epoxy resin (shown in formula III), which is obtained by the reaction between bisphenol AD and epichlorohydrin, the epoxy resins shown in formula IV through VII obtained by the reaction between bisphenol compounds and epichlorohydrin, phenol-novolak type epoxy resins (shown in formula VIII) and cresol-novolak type epoxy resins (shown in formula IX), etc.

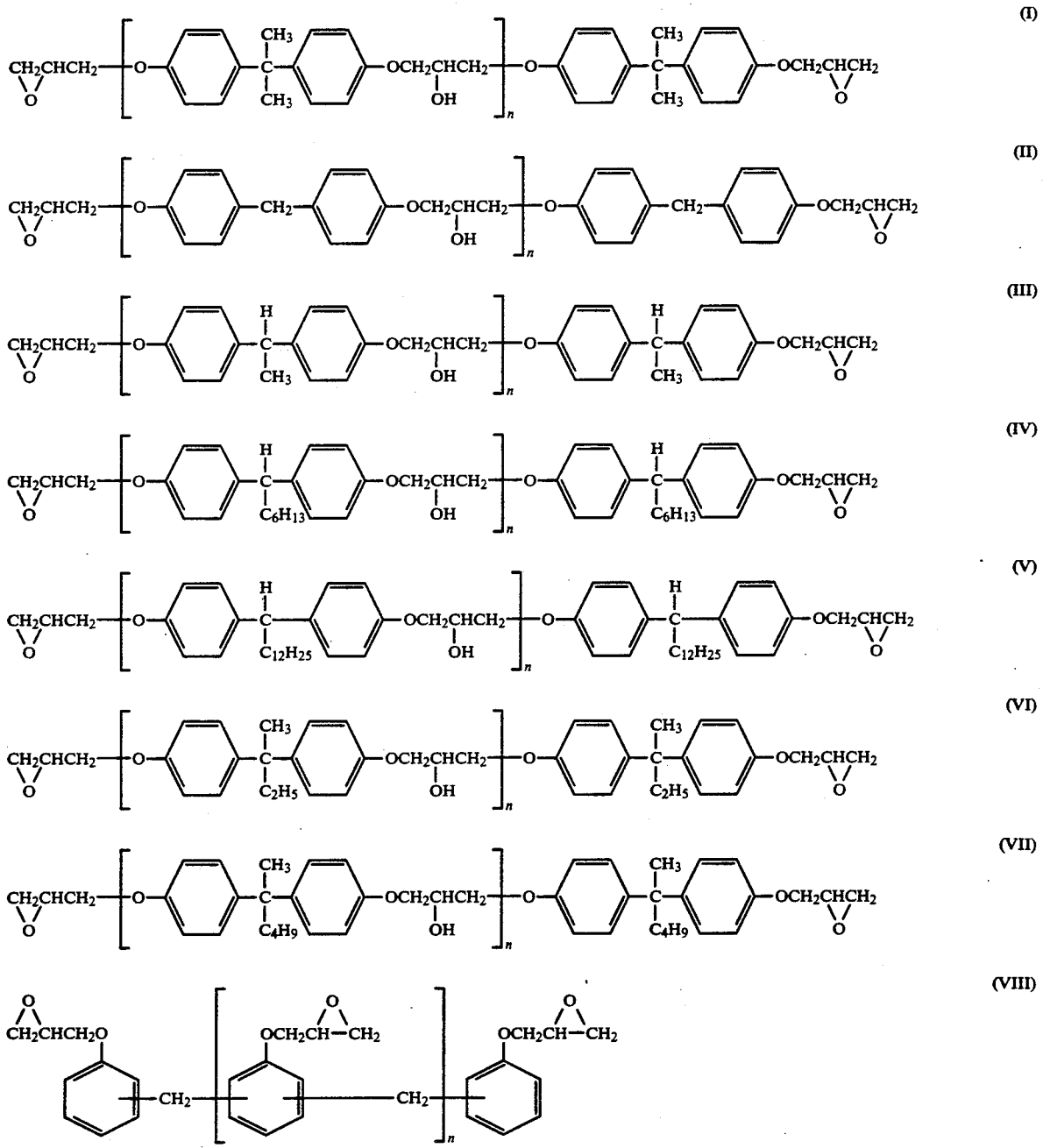

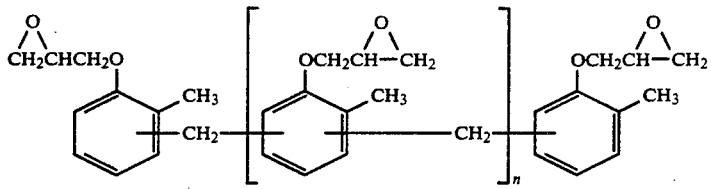

In the above formulae (I)-(IX), the value of n is ordinarily 0-50, and preferably 1-6. If the value of n is 7 or greater, then the viscosity of the resin when heated and fused becomes extremely high. Consequently when the coated particles so obtained are, for example, placed on glass plates and heated, the adhesive resin layer does not liquefy and does not flow down easily, and therefore the desired adhesion to the glass is difficult to realize. On the other hand, if the value of n is zero, then the resin assumes a liquid form at room temperature, the viscosity of the resin when heated is unduly low, and consequently the functional layer of the coated particles is tacky and/or spreads over an unduly large area on the glass.

The epoxy resins shown in the above formulae (I)--(IX) may either be used singly or several of these may be mixed and used in combination. Among the epoxy resins shown in formulae (I)-(IX), those especially suitable for the present purpose are bisphenol A type epoxy resin shown in formula (I), phenol-novolak type epoxy resin shown in formula (VIII) and cresol-novolak type epoxy resin shown in formula (IX).

The hardeners appropriate for use with the aforesaid epoxy resins for the purposes of the present invention include the following.

(1) Amine type hardeners

Aliphatic amine compounds such as ethylene-diamine, diethylenetriamine, triethylenetetramine, tetraethylenepentamine, menthenediamine, isophorone-diamine, bis(4-amino-3-methylcyclohexyl)methane, and the like; aromatic amines such as methaphenylenediamine, methylenedianiline, benzyldimethylamine, 2-(dimethylaminomethylphenol), and the like.

(2) Polyaminoamide type hardeners

Condensation products of organic carboxylic acids and polyethyleneamines such as ethylenediamine, diethylenetriamine, triethylenetetramine, tetraethylenepentamine and pentaethylenetetramine, and the like. The organic carboxylic acids which can appropriately be used in such condensation compounds include polymerized fatty acids obtained by heat treatment of unsaturated fatty acids such as linoleic acid and linolenic acid, epoxidized unsaturated fatty acids, alkenyl succinic acid, amino acids, etc.

(3) Acid anhydride type hardeners

Dodecenyl succinic anhydride, polyadipic anhydride, phthalic anhydride, methylhexahydrophthalic anhydride, trimellitic anhydride, pyromellitic anhydride, etc.

(4) Basic active hydrogen type hardeners

Dicyandiamide, adipic dihydride, eicosandioic dihydride, 7,11-octadecadiene-1,18-dicarbohydrazide, 1,3-bis(hydrazinocarboethyl)-5-isopropylhydantoin, etc.

(5) Imidazole type hardeners 2-methylimidazole, 2-ethyl-4-methylimidazole, 2-n-alkylimidazoles, 2-phenylimidazole, 2-phenyl-2-methylimidazole, 2-ethylimidazole, 1-cyanoethyl-2-methylimidazole, 1-cyanoethyl-2-ethyl-4-methylimidazole, 2,4-diamino-6-(2'-methylimidazolyl)ethyl-1,3,5-triazine, 2-4-diamino-6-(2'-ethyl-4'-methylimidazolyl)ethyl-1,3,5-triazine, 2,4-diamino-6-(2'-n-undecylimidazolyl)ethyl-1,3,5-triazine, 2-phenylimidazol-4,5-di-yl-dimethanol, (5-methyl-2-phenyl-4-imidazolyl)methanol, etc.

(6) Tertiary amine type hardeners

Tris(dimethylaminomethyl)phenol, dimethyl-benzylamine, 1,8-diazabicyclo(5,4,0)undecane, etc.

(7) Other types of hardeners

Salts of Lewis or Brønsted acids, such as monoethylamine salt of boron trifluoride, piperidine salt of boron trifluoride, monoethylamine salt of trifluoromethanesulfonic acid, diphenyliodonium salt of hexafluoroarsenic acid, etc.

The hardeners listed in categories (1)-(7) above can be used either by direct mixing with the aforesaid epoxy resins or in microcapsulated form. These hardeners cause a hardening reaction when mixed with an epoxy resin and heated to a specified temperature. The temperature at which hardening (i.e., curing) occurs varies according to the type of hardener used, but is ordinarily in the range of 50° C. to 250° C. The preferred hardening temperature for the present purpose is in the range of 90° C. and 200° C.

The hardener can be used in an amount of 0.5-100 parts by weight for every 100 parts by weight of the epoxy resin, and an amount of hardener in the range of 5-50 parts by weight for every 100 parts by weight of the epoxy resin is particularly desirable.

Among the above-mentioned hardeners, those which are particularly suitable for use in the process of the present invention are those in categories (4) (i.e., basic active hydrogen type hardeners) and (5) (i.e., imidazole type hardeners). When these types of hardeners are mixed with epoxy resins, no hardening reaction occurs at ordinary temperatures, and therefore the pot life of the epoxy resin composition so obtained is long, moreover, the said composition can be stored for comparatively long periods of time, but will harden rapidly when heated above a specified temperature.

All of the aforesaid hardeners are of the heat-hardening type. However, the following ultraviolet-hardening types can also be used for the purposes of the present invention.

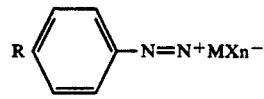

$MXn^-$: $BF_4^-$, $PF_6^-$, $AsF_6^-$, $SbF_6^-$ (b) Aromatic sulfonium salts

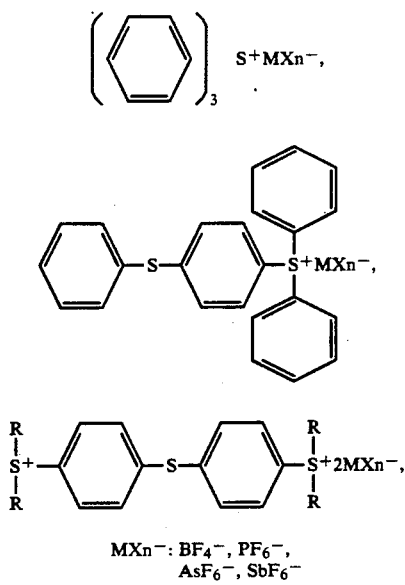

(c) Aromatic iodonium salts

These ultraviolet-hardening types of hardeners should desirably be used in an amount of 0.1–10 parts by weight for every 100 parts by weight of the epoxy resin.

The method used for coating core particles with epoxy resin composition is as follows.

First, the epoxy resin is dissolved in a solvent such as acetone, tetrahydrofuran, methyl ethyl ketone, benzene, toluene, etc., then the core particles and hardener are mixed into the solution so obtained and thoroughly dispersed. The amount of the solvent used is arbitrary, but the concentration of the epoxy resin in the solution should desirably be in the range of 3% by weight to 30% by weight. Next, while the mixture is being stirred, the solvent is evaporated by applying reduced pressure or another suitable method, causing the deposition of the epoxy resin composition onto the surfaces of the core particles and thereby forming the required epoxy resin layer. Mutual cohesion or aggregation of particles, which is prone to occur during the evaporation of the solvent, can be prevented by adding a small amount of precipitant to the solution. The precipitant is a liquid which is miscible with the said solvent, and the epoxy resin cannot be soluble thereinto. Water is particularly effective as a precipitant of this kind. Core particles with a titanium oxide polymer layer can also be used in the above-mentioned process for forming the epoxy resin layer.

The functional layer made of a hot-melt adhesive resin or epoxy resin manifest adhesive properties when heated at a specified temperature. Therefore, when particulate spacers having core particles and the functional layers formed thereon are interposed between two substrate plates and heated, the resin of the functional layer melts and thus the particulate spacers adhere to the substrates. Hence, if the particulate spacers of the present invention are used, for example, as spacers for liquid crystal display cells, the particles are not displaced from the points of adhesion to the substrates, and consequently a fixed distance can be maintained between the substrates.

Particulate spacers with a color layer

This invention also includes a colored particulate spacer of a specific type. This colored particulate spacer can be obtained by first forming core particles made of a cross-linked resin, and then coloring the said core particles by treatment with acidic treating agent, and then with a basic dye. The core particles are obtained by the polymerization of ethylenically unsaturated monomers.

The said ethylenically unsaturated monomer comprises at least one ethylenically unsaturated group, and one or more kinds of monomers can be used in combination. In particular, the use of monomers possessing at least two ethylenically unsaturated groups in an amount of at least 5% by weight, and preferably 10% by weight based on the total weight of the ethylenically unsaturated monomers, is desirable. If the amount of monomers possessing at least two ethylenically unsaturated groups is less than 5% by weight, then the hardness of the core particles so obtained is low, and moreover, these core particles cannot be colored to a deep shade.

The monomers possessing at least two ethylenically unsaturated groups include the following types of monomers (1)–(4).

(1) x-methylolalkyl y-acrylates (or methacrylates) (wherein x and y are integers satisfying the condition $x \geq y \geq 2$). Specifically, this category includes, for example, tetramethylolmethane tetra-acrylate (or -methacrylate), tetramethylolmethane triacrylate (or trimethacrylate), tetramethylolmethane diacrylate (or dimethacrylate), trimethylolpropane triacrylate (or trimethacrylate), dipentaerythritolhexa-acrylate (or -methacrylate), dipentaerythritolpenta-acrylate (or -methacrylate), glycerol triacrylate (or methacrylate) and glycerol diacrylate (or methacrylate), etc.

(2) Polyoxyalkylene glycol diacrylates (or methacrylates), specifically, this category includes, for example, polyethylene glycol diacrylate (or dimethacrylate), polypropylene glycol diacrylates (or dimethacrylate), etc.

(3) Triallyl cyanurates (or isocyanurates), triallyl trimellitate, etc.

(4) Divinylbenzene, diallyl phthalates, diallyl acrylamides, etc.

The monomers possessing ethylenically unsaturated group which are capable of copolymerizing with the aforesaid monomer possessing at least two ethylenically unsaturated groups include, styrene, vinyltoluene, acrylonitrile, alkyl acrylates (or methacrylates), vinyl esters, acrylic (or methacrylic) acid, hydroxyalkyl acrylates (or methacrylates), acrylamide (or methacrylamide), N-methylol acrylamide (or methacrylamide), N,N-dimethylaminopropyl acrylamide, etc.

Core particles can be manufactured by polymerizing the aforesaid monomers in the presence of radical catalysts. This polymerization should preferably be conducted at the temperature of the boiling points or lower of the dispersion medium and the various monomers used. As radical catalysts, ordinary radical-generating catalysts such as organic peroxides or azo compounds are appropriate for the present purpose. The applicable peroxides include benzoyl peroxide, lauroyl peroxide and di-t-butyl peroxide, while the applicable azo compounds include, for example, 2,2'-azobisisobutyronitrile, 2,2'-azobis(2,4-dimethylvaleronitrile), etc.

Next, the core particles so obtained are treated with acidic treating agent under specified conditions. The treatment can be performed at a temperature in the range of from room temperature to 200° C. The bath ratio of the treatment is in the range of 1:2 to 1:50. Applicable acidic treating agents include concentrated sulfuric acid, fuming sulfuric acid, sulfur trioxide, sulfurous acid, sulfites, hydrogensulphites, sulfonyl chloride, chlorosulfuric acid, fluorosulfuric acid and aminosulfonic acid. One or more of the substances can be used for the present purpose.

When the core particles are treated with the acidic treating agent in this manner, the residual unreacted ethylenically unsaturated groups undergo addition reactions with the acidic treating agent, and/or the other functional groups on the surface of the core particles undergo addition reactions with the acidic treating agent. Thus, the acidic treating agent becomes chemically bonded to the core particles. In particular if a large amount of monomers possessing at least two ethylenically unsaturated groups are used, then the acidic treating agent mentioned above reacts with the ethylenically unsaturated groups remaining on the surface of the core particle to form sulfonic acid ester under comparatively gentle reaction conditions. If the core particles are manufactured using a monomer possessing an aromatic ring, then sulfonic acid groups can be introduced onto the said aromatic ring by means of sulfonation reactions.

Next, the core particles which have been treated with acidic treating agent in the above manner are treated with a dye. The dyeing is appropriately performed at a temperature of 60° C.–120° C. for a period of 30 minutes to 15 hours, at a dye concentration of 0.5–5% by weight, with a bath ratio of 1:30 to 1:10. The pH of the dying solution is adjusted to a value in the range of 2–6 using acetic acid or sodium acetate. The dyes used for this purpose are, preferably, basic dyes which can combine chemically with the acidic treating agent and which have been bonded to the aforesaid core particles as mentioned above. Generally, these basic dyes are hydrochlorides of aromatic bases containing chromophores. The basic groups may contain amino groups ($-NH_2$), alkylamino groups ($-N(CH_3)_2$), etc. The basic dyes contain no acidic groups, and when the basic dyes are dissolved in water, cations are formed. Specifically, the basic dyes include triphenylmethane derivatives, anthraquinone derivatives, azo compounds, methine compounds and oxazine derivatives, etc.

This coloring treatment induces ionic bonding of the basic dye to the sulfonic acid groups on the core particles, after which the colored particles can be recovered by selective filtration and washing. This treatment serves to eliminate the residual dye as well as the inorganic salts formed as by-products by the aforesaid reaction. Thus, colored particles in pure form, containing no alkali metals or other impurities can be obtained.

As described above, since the dyeing of the resin particles involves the chemical bonding of the dye to the resin particles, a uniform deep coloring can be achieved with a small amount of dye, moreover, the colored particles so obtained possess excellent solvent tolerance. If such colored particles are used as spacers in liquid crystal display cells, then, since the optical transmittance of such particles is low, high-quality liquid crystal display cells with excellent display contrast can be prepared. Since the central portions of the core particles are not acid-treated, a colored layer is formed only on the periphery of the core particles. Therefore, the colored particles can maintain an adequate state of hardness originated from the characteristics of the cross-linked resin. Hence, by using these colored particles, a liquid crystal display cell having a pair of substrates, the gap therebetween can be kept at a constant rate with precision as compared with conventional liquid crystal display cells can be produced. This is due to the fact that, when these colored particles with a functional (colored) layer are compressed onto the substrate, the functional layers are deformed and therefore the colored particles come into contact with a wider area of the inner faces of the substrates, hence, the positions of the said colored particles cannot easily shift within the gap of the liquid crystal display cells.

Liquid Crystal Display Cells

FIG. 1 shows an enlarged partial view of the liquid crystal display cell of the present invention.

The liquid crystal display cell comprises a pair of substrates 1 having an electrode 10 on the surface thereof, at least one of which is transparent, said substrates 1 being disposed at a constant gap so that the respective electrodes of said substrates face to each other; a sealing material 4 filling the peripheral portion of the gap space between the substrates 1; particulate spacers 2 dispersed in the gap between the substrates 1 to maintain a constant gap between the substrates, each of said particulate spacers 2 having a core particle and a functional layer formed on the surface of said core particle; and a liquid crystal composition 3 filling the gap between the substrates. The substrate is made of any suitable material such as glass, resin, or the like. The particulate spacer 2 has a core particle 2b and a functional layer 2a made of a hot-melt adhesive resin. Additionally, an intermediate layer of titanium oxide polymer 2c may be interposed between the core particle 2b and the functional layer 2a. Alternately, the functional layer is a color layer which is formed by treatment of the core particle with an acidic treating agent and then with a basic dye.

The sealing material 4 is composed of an epoxy resin, ultraviolet-curable resin, or other appropriate substance, with colorless or colored particles 4a as spacers.

An example of a method for the production of the aforesaid liquid crystal display cell using hot-melt type particulate spacers will be described.

First, particulate spacers are dispersed upon a first substrate, next, the particulate spacers are pressed onto the substrate with a pressure plate having no adhesiveness to these particulate spacers, while simultaneously applying heat, which results in the adhesion of the spacers to the substrate. The pressure plate is composed of a material which does not adhere to the particulate spacers. For example, sheets composed of polytetrafluoroethylene, steel or glass plates with surface coatings of polytetrafluoroethylene, may be appropriately used for this purpose.

After securing the adhesion of the particulate spacers to the substrate, the pressure plate is removed. Next, a second substrate with sealing material at the peripheral portion except for an orifice for the injection of liquid crystal composition is superposed upon the first substrate, and the space between the two substrates is filled with a liquid crystal composition. Then, pressure is applied to the first and second substrates while applying heat to the peripheral portion of the substrates for the purpose of curing the sealing material, In the aforesaid procedure, the spacers adhere to the inner face of the first substrate. Hence, even if the liquid crystal display cell is subjected to bending or vibration, the spacers will not be detached from the inner face of the first substrate. The same process can be applied when particulate spacers with epoxy resin layer are used. When the particulate spacers with functional color layer formed on a core particle made of cross-linked resin are used, the heating process or adhering the spacers to the substrate is not necessary. As mentioned above, the method of the present invention can provide liquid crystal display cells such that a constant gap is maintained between the pair of substrates.

EXAMPLES

The following materials were used in the examples to be described below.

(A) Core particles (1) Silica particles: SEAHOSTAR KE-P100, manufactured by Nippon Shokubai Kagaku Kogyo Co., Ltd.

(2) Melamine resin particles: UNIVEKS WA, manufactured by Unitika, Ltd.

(3) Plastic particles: Polymer particles prepared by polymerizing divinylbenzene.

(B) Titanate compounds (1) Tetrapropoxytitanium: Trade name A-1, manufactured by Nippon Soda Co., Ltd.

(2) Tetrabuthoxytitanium: Trade name B-1, manufactured by Nippon Soda Co., Ltd.

(3) Tetrakis(2-ethylhexoxy)titanium: Trade name TOT, manufactured by Nippon Soda Co., Ltd.

(C) Hot-melt adhesive resins (1) Waxy polyethylene: Trade name SANWAX 151-P, manufactured by Sanyo Kasei Kogyo Co., Ltd.

(2) Carboxyl group-containing ethylene-vinyl acetate copolymer: Trade name DUMILAN C-2280, manufactured by Takeda Yakuhin Kogyo Co., Ltd.

(3) Oxidized waxy polyethylene: Trade name SANWAX E-300, manufactured by Sanyo Kasei Kogyo Co., Ltd.

(D) Epoxy resin composition (D-1) Epoxy resin

Solid epoxy with an epoxy equivalent of 480 and a softening point of 68° C.: Trade name EPICOAT 1001, manufactured by Yuka Shell Epoxy, Co., Ltd.

(D-2) Hardening agents (1) 2-ethyl-4-methylimidazole: Trade name CUREZOL E4MZ, manufactured by Shikoku Kasei Kogyo Co., Ltd.

(2) Dicyanamide: Trade name DICY-7, manufactured by Yuka Shell Epoxy, Co., Ltd.

(3) 2-phenylimidazole-4,5-diyldimethanol: Trade name 2PHZ, manufactured by Shikoku Kasei Kogyo Co., Ltd.

(4) 1-cyanoethyl-2-ethyl-4-methylimidazole: Trade name 2E4MZ-CN, manufactured by Shikoku Kasei Kogyo Co., Ltd.

(E) Dyes (1) Basic dye CATIRON BLACK SBH: manufactured by Hodogaya Kagaku Co., Ltd.

(2) Basic dye CATIRON BRILLIANT SCARLET CD-GLH: manufactured by Hodogaya Kagaku Co., Ltd.

The methods used for measurement of physical properties of core particles were as follows.

(A) Measurement of mean particle size

This was performed with a Coulter Counter Model ZB/C-1000 particle size measuring apparatus.

(B) Observation of particle surfaces

The surfaces of the core particles were observed with a scanning electron microscope.

(C) Test for dispersibility of particulate spacers

The particulate spacers were suspended in Freon-113 to obtain a spray solution, which was sprayed onto a glass plate with a nozzle, then the state of dispersion of the particulate spacers on the glass plate was observed.

(D) Test for adhesion of particulate spacers to glass plate

The glass plates upon which particulate spacers were dispersed, as obtained in the aforesaid dispersibility tests (C), were left for 10 minutes in a heating furnace at a specified temperature. Next, the sites of adhesion of the particulate spacers to the glass plate were observed with a 200× magnifying glass or an electron microscope.

In cases where the functional layer had been formed with waxy polyethylene, the temperature of the heating furnace was set to 110° C.

In cases where the functional layer had been formed with carboxyl group-containing ethylene-vinyl acetate copolymer, the temperature of the heating furnace was set to 120° C.

In cases where the functional layer had been formed with epoxy resin, the temperature of the heating furnace was set to 150° C.

(E) Measurement of transmittance of colored particulate spacers (colored resin particles)

First, 1 g of colored resin particles were dispersed in 100 ml of Freon-113 and this dispersion was spread onto a glass plate 30 mm long, 10 mm wide and 1 mm thick. Another glass plate of the same dimensions was then superimposed over the first glass plate so as to sandwich the colored resin particles. These glass plates were held lightly and then fastened with adhesive tape extending over both the top and bottom glass plates. Next, this sample was placed in an oven at 50° C. to evaporate the Freon-113, thereby forming a sample with colored resin particles between the two glass plates in a monolayer state and in a close-packed structure. Two such samples were prepared, following which these two samples were stacked and fastened together with adhesive tape extending over the top and bottom samples, thereby obtaining a specimen for use in the measurement of visible light transmittance. Using four glass plates not sandwiching colored resin particles as a control, the visible light transmittance of the aforesaid specimen was measured over the 400-800 nm region with a spectrophotometer.

(F) Reflectance

The spectral reflectance of the specimens prepared as described in item (E) above was measured over the 400-800 nm region using magnesium oxide as a standard white surface.

(G) Observation of cross-sections of colored particulate spacers (colored resin particles)

Colored resin particles were mixed into epoxy resin and the mixture was hardened, after which this hardened mass was cut with a microtome to expose crosssectional surfaces of the colored resin particles. After osmic acid treatment, an electron micrograph of the cross-sections was taken at a magnification of 10,000×.

(H) Rate of retention of particulate spacers

Adhesive tape was fastened to the surface of a glass plate with adhering particulate spacers obtained as described in item (D) above (i.e., to the surface upon which the particulate spacers had adhered), and then the tape was detached. This operation was performed three times. The number of particulate spacers on the glass plate surface before the adhesive tape was applied as well as the number of particulate spacers remaining on the surface after the application and detachment of the adhesive tape in the above manner were counted, and the ratio of the number of particulate spacers on the glass plate surface after the application and removal of the tape to the number of particulate spacers on the glass plate surface prior to the application of the tape was calculated.

EXAMPLE 1

First, 2.5 l of a 5% polyvinyl alcohol aqueous solution, 625 g of divinylbenzene, 625 g of dipentaerythritol hexaacrylate, and 18.8 g of benzoyl peroxide were loaded into a 5 liter separable flask fitted with a stirrer and a reflux condenser. While stirring, the temperature was raised to 80° C. and a polymerization reaction was allowed to proceed for 10 hours, after which the temperature of the reaction mixture was further raised to 95° C., and polymerization was continued for 1 hour. Then, after cooling down to room temperature, the mixture was filtered with a glass filter (G-4). The material separated was then washed, thereby obtaining resin particles 6-15 μm in size. By sizing the resin particles, 10 g of dry resin particles with mean central diameter $(D_n)$ 10.08 μm (standard deviation $(\sigma)$ 0.28 μm) were obtained.

Next, 100 g of 95% concentrated sulfuric acid was placed in a 200 ml beaker, and the aforesaid resin particles were gradually added to the beaker, while stirring the mixture with a magnetic stirrer. The reaction with acid was conducted at 55° C. for 6 hours. After this acid treatment, the resin particles were separated by filtration and then thoroughly washed with water.

Next, 6 g of a basic dye (CATIRON BLACK SBH) was dissolved in 300 ml of water and a dye bath solution was obtained by adjusting this solution to pH 4 with acetic acid. Then, the aforesaid acid-treated resin particles were added to this dye bath solution, and dyeing treatment was performed for 6 hours at 95° C. Next, the excess dye bath solution was removed by filtration and the material was washed with water, thereby obtaining black colored resin particles.

Examination of the colored resin particles with a 400× optical microscope revealed that all of these resin particles were indeed dyed black, and no uncolored resin particles were observed in the sample. The mean central diameter $(D_n)$ of the colored resin particles so obtained was 0.5%–10% greater than that of the resin particles prior to the aforesaid dyeing treatment.

EXAMPLE 2

The same procedure as that used in Example 1 was followed, except that 187.5 g of tetramethylolmethane triacrylate, 562.5 g of tetraethylene glycol dimethacrylate, and 500 g of methacrylic acid were used in place of the divinylbenzene and dipentaerythritol hexaacrylate. This procedure yielded resin particles of mean central diameter $(D_n)$ 5–15 μm.

Next, the resin particles were sized, and 3 g of dry resin particles with mean central diameter $(D_n)$ 8.36 μm (standard deviation $(\sigma)$ 0.33 μm) were obtained. Next, these resin particles were added to 30 g of 95% concentrated sulfuric acid and subjected to acid treatment at room temperature (25° C.) for 3 hours. The acid-treated resin particles were then separated by filtration and washed with water.

Next, 1 g of a basic dye (CATIRON BRILLIANT SCARLET CD-GLH) was dissolved in 100 ml of water and a dye bath solution was obtained by adjusting this solution to pH 4 with acetic acid. Then, the aforesaid acid-treated resin particles were added to this dye bath solution, and dyeing treatment was performed for 1 hour at 95° C. The filtrate was completely transparent and 100% of the dye bound to the resin particles. After separation by filtration, the resin particles were washed with water 4–5 times and then dried, thereby obtaining red-colored resin particles.

Examination of the colored resin particles with a 400× optical microscope revealed that all of the resin particles were indeed dyed red, and no uncolored resin particles were observed in the sample. The mean central diameter $(D_n)$ of the colored resin particles so obtained was 0.5%–10% greater than that of the resin particles prior to the aforesaid dyeing treatment.

EXAMPLE 3

(A) Preparation of colored resin particles

The same procedure as that used in Example 1 was followed, except that 30 parts by weight of dipentaerythritol hexaacrylate and 60 parts by weight of divinylbenzene were used. This procedure yielded 10 g of resin particles with mean central diameter $(D_n)$ 6.48 μm (standard deviation $\sigma$) 0.36 μm).

Next, 30 g of 95% concentrated sulfuric acid was placed in a 200 ml beaker, and 10 g of the resin particles were gradually added to the beaker, while stirring. The reaction with acid was conducted at 60° C. for 3 hours. Next, the sulfuric acid was removed by filtration and the acid-treated resin particles were washed with water. On the other hand, 6 g of a black basic dye (CATIRON BLACK SBH) was dissolved in 300 ml of water and a dye bath solution was obtained by adjusting this solution to pH 4 with acetic acid. Then, the aforesaid acid-treated resin particles were added to this dye bath solution, and dyeing treatment was performed for 5 hours at 95° C. Next, the dye bath solution was removed by filtration and the resin particles were washed with water and then with acetone, thereby obtaining the desired colored resin particles.

The mean central diameter $(D_n)$ of the colored resin particles so obtained was 6.76 μm, with standard deviation $(\sigma)$ 0.35 μm. The mean central diameter of the colored resin particles so obtained was 4.3% greater than that of the resin particles prior to the aforesaid dyeing treatment. Examination of these colored resin particles with a 400 × optical microscope revealed that all of the resin particles were indeed dyed black, and no uncolored resin particles were observed in the sample.

(B) Measurement of physical properties of colored resin particles (1) Measurement of transmittance Samples were prepared using the colored resin particles obtained as described in item (A) above, and the visible light transmittance of the samples was measured. The results indicated a transmittance not greater than 3-5% throughout the region 400-800 nm.

(2) Spectral reflectance

Samples were prepared using the colored resin particles obtained as described in item (A) above, and the spectral reflectance of the samples was measured throughout the region 400-800 nm. The results indicated a reflectance of 0%.

(3) Observation of cross-sections of colored resin particles

Electron micrographs of cross-sections of the colored resin particles obtained as described in item (A) above were taken at a magnification of 10,000 ×. These micrographs revealed that the colored resin particles were lightly stained by osmic acid up to about 3 $\mu$m from the center. About 0.5-0.7 $\mu$m of the peripheral portion of the colored particles was unstained by osmic acid. This fact suggested that the acid treatment and dyeing treatment occurred in a surface layer of thickness 0.5-0.7 $\mu$m.

(C) Production of liquid crystal display panels

Substrates were prepared by forming transparent ITO electrodes on one face of each of glass plates of thickness 1.1 mm. Two such substrates were placed together but separated by a gap so that the their electrodes surfaces were mutually contraposed. A sealing material was prepared by admixing the uncolored resin particles with mean central diameter ($D_n$ 6.48 $\mu$m (standard deviation ($\sigma$) 0.36 $\mu$m), obtained as described in item (A) above, into an epoxy acrylate UV adhesive agent. This sealing material was applied by screen printing onto the peripheral portion of the gap between the aforesaid two substrates, excepting an orifice for the injection of liquid crystal material, after which the sealing material was hardened by UV irradiation while the two substrates were pressed together. Before this sealing was performed, the colored resin particles ($D_n = 6.67$ $\mu$m, $= 0.35$ $\mu$m) obtained as described in the preceding item (A) were dispersed as particulate spacers in Freon-113 to prepare a dispersion which was spread onto one of the two substrates in such a manner that the approximately 100 particles per square millimeter were deposited on the substrate surface.

Next, a nematic liquid crystal was injected through the aforesaid injection orifice, which was then sealed with a UV-hardenable sealing material, thereby obtaining a liquid crystal display panel.

Ten liquid crystal display panels were produced under the same conditions as indicated above. For each of these ten liquid crystal display panels, the gap between the pair of substrates was measured, and the widths of these gaps were found to be 6.35±0.05 $\mu$m. When the liquid crystal display panels obtained in this manner were allowed to exhibit a display of the negative type (normally black), the colored resin particles were not visible; moreover, excellent contrast was obtained.

Comparative Example

Ten liquid crystal display panels were produced under the same conditions as those of Example 3, except that uncolored resin particles of the same kind as those used in the sealing material were also used in place of the colored resin particles. The gap between the pair of substrates was measured for each of these ten liquid crystal display panels, and the widths of these gaps were found to be 6.20±0.10 $\mu$m.

EXAMPLE 4

Both colored resin particles and uncolored resin particles, obtained by the process described in item (A) of Example 3, were separately dispersed in Freon-113 (2 g/200 ml). Next, these dispersions were spread onto tempered glass plates so that approximately 100 particles per square millimeter were deposited on the plate surface. These plates were then covered with other glass plates, and pressure was applied to these specimens with a press in successive increments of 5 kg/cm$^2$. The appearance of the resin particles when crushed was examined with a magnifying glass, which revealed that the uncolored resin particles had been crushed into minute fragments, whereas the colored resin particles were broken into relatively large pieces.

Furthermore, liquid crystal display panels were produced using the colored resin particles and uncolored resin particles, respectively, obtained by the procedure described in item (A) of Example 3. One panel was selected from each of these two sets of liquid crystal display panels and subjected to ultrasonic cleaning at 40° C. for 10 hours in an ultrasonic cleaner, after which the dark-field contrast was observed with the naked eye. The results of these observations revealed a tendency for the contrast of the liquid crystal display panel produced with the uncolored resin particles to decrease (relative to the blank). On the other hand, the liquid crystal display panel produced with the colored resin particles was unchanged. Also, examination of the state of dispersion of the resin particles in the two panels with a 100 ×optical microscope disclosed that, in the panel produced using uncolored resin particles, the resin particles had shifted within the space between the two substrates of the liquid crystal display panel and had agglomerated at the periphery of the panel. On the other hand, this shifting of the resin particles was substantially not observed in the panel produced with the colored resin particles.

EXAMPLE 5

First, 10 g of resin particles with mean particle size 10.10 $\mu$m (standard deviation 0.40 $\mu$m), consisting of a divinylbenzene polymer, was added to a solution prepared by dissolving 0.15 g of tetrapropoxytitanium in 15 ml of n-hexane, and the ingredients were well mixed with a spatula, after which the n-hexane was evaporated. Next, this mixture was thoroughly ground in a mortar, eliminating the lumps.

Then, 2.6 g of waxy polyethylene (SANWAX 151-P) was added to 10 ml of toluene and dissolved by warming in a constant temperature bath at 80° C. The resin particles treated with the organic titanate compound were then added to this solution, and the mixture was completely dispersed into a milky emulsion, which was then dried at 90° C. under a pressure of 300 mmHg.

Then, 20 ml of glycerin was added to the lumps of particulate spacers obtained in this manner. The lumps were thoroughly crushed in a mortar and then completely demolished with a three-wheel roller.

Next, using 1 liter of ethanol, this material was washed on a glass filter and then suspended in 1 liter of an ethanol/Freon-113 mixture (volume ratio 2:1). Then, the material was left standing in that state for 15 hours and the supernatant was decanted to remove minute flakes of waxy polyethylene. The material was again filtered on a glass filter, then washed with Freon-113 and dried by heating to 60° C. in a Geer's oven, thereby obtaining the final particulate spacers.

The mean particle size of these particulate spacers was 10.42 μm (standard deviation 0.43 μm). From this result, the mean thickness of the waxy polyethylene layer formed on the surfaces of the particulate spacers was calculated to be 0.16 μm.

Examination of the surfaces of these particulate spacers revealed that the colored resin particles had indeed been uniformly coated with waxy polyethylene.

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the colored resin particles.

EXAMPLE 6

First, 10 g of inorganic particles with mean particle size 7.30 μm (standard deviation 0.32 μm), composed of silicate glass, was added to a solution prepared by dissolving 0.35 g of tetrabutoxytitanium in 15 ml of n-hexane, and the ingredients were well mixed with a spatula, after which the n-hexane was evaporated. Next, this mixture was thoroughly ground in a mortar, eliminating the lumps.

Then, 2.9 g of a carboxyl group-containing ethylene-vinyl acetate copolymer (DUMILAN C-2280) was used as hot-melt resin. Other than the use of the aforesaid materials, particulate spacers were obtained by the same procedure as that employed in Example 5.

The mean particle size of the particulate spacers so obtained was 7.58 μm (standard deviation 0.43 μm), and the mean thickness of the resin layer was calculated to be 0.14 μm.

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the particles.

EXAMPLE 7

First, 10 g of short glass fibers with mean diameter 9.05 μm and mean length 15.1 μm, composed of borosilicate glass, was added to a solution prepared by dissolving 0.3 g of tetrakis(2-ethylhexoxy)titanium in 15 ml of n-hexane, and the ingredients were well mixed with a spatula, after which the n-hexane was evaporated. Next, this mixture was thoroughly ground in a mortar, eliminating the lumps. Oxidized waxy polyethylene was used as hot-melt resin.

Other than the use of the aforesaid materials, glass fibers were then obtained by the same procedure as that employed in Example 5. The mean diameter of the glass fibers so obtained was 9.31 μm and the mean thickness of the resin layer was calculated to be 0.13 μm.

EXAMPLE 8

First, 10 g of resin particles with mean particle size 10.10 μm (standard deviation 0.40 μm), consisting of a divinylbenzene polymer, was added to a solution prepared by dissolving 0.15 g of tetrapropoxytitanium in 15 ml of n-hexane, and the ingredients were well mixed with a spatula, after which the n-hexane was evaporated. Next, this mixture was thoroughly ground in a mortar, eliminating the lumps.

As a hot melt resin, 2.6 g of waxy polyethylene (SANWAX 151-P) was added to 50 ml of toluene, and dissolved by warming in a hot water bath at 80° C.

Next, the aforesaid waxy polyethylene solution was added to a surfactant solution prepared by dissolving 0.5 g of the surfactant (NOIGEN EA120, manufactured by Daiichi Kogyo Seiyaku Co., Ltd.), and an emulsion was then prepared by stirring this mixture, while maintaining the temperature at 80° C.

Next, the resin particles treated with the organic titanate compound were added to this emulsified solution, thoroughly dispersed and suspended in the emulsion, after which the temperature of the mixture was slowly reduced to 45° C. by cooling at the rate of 0.1° C. per minute. Stirring was continued throughout this procedure. This suspension was filtered with a glass filter (G-4). The material separated was then thoroughly washed with methanol and suspended in 1 liter of a mixed ethanol/Freon-113 solution (volume ratio 2:1). The mixture was then left standing undisturbed in this state for 15 hours, and the supernatant was decanted to remove minute flakes of waxy polyethylene. The remaining material was again filtered with a glass filter, then washed with Freon113, and vacuum-dried at room temperature, thereby obtaining the final particulate spacers.

The mean particle size of these particulate spacers was 10.64 μm, with standard deviation 0.45 μm. From this result, the mean thickness of the waxy polyethylene layer formed on the surfaces of the colored resin particles was calculated to be 0.27 μm. The surfaces of these colored resin particles were uniformly coated with waxy polyethylene, without any gaps.

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the colored resin particles.

EXAMPLE 9

First, 10 g of inorganic particles with mean particle size 7.30 μm (standard deviation 0.32 μm), composed of silicate glass, was added to a solution prepared by dissolving 0.35 g of tetrabutoxytitanium in 15 ml of n-hexane, and the ingredients were well mixed with a spatula, after which the n-hexane was evaporated. Next, this mixture was thoroughly ground in a mortar, eliminating the lumps.

Then, 2.9 g of a carboxyl group-containing ethylene-vinyl acetate copolymer was added to 200 ml of toluene and dissolved by warming in a hot water bath at 60° C. The inorganic particles treated with the organic titanate compound were added to this solution. After thorough dispersion and suspension, ethanol was added dropwise to the mixture at the rate of 0.5 ml/min, and this procedure was continued until 120 ml of ethanol had been added thereto. Then, after cooling down to room temperature, the mixture was filtered with a glass filter (G-4). The material separated was then washed with ethanol and suspended in 1 liter of a mixed ethanol/Freon-113 solution (volume ratio 2:1). The mixture was then left standing undisturbed in this state for 15 hours, and the supernatant was decanted to remove suspended fragments of carboxyl group-containing ethylene-vinyl acetate copolymer. The remaining material was again filtered on a glass filter, then washed with Freon-113, and vacuum-dried at room temperature, thereby obtaining the final particulate spacers.

The mean particle size of these particulate spacers was 7.74 μm, with standard deviation 0.40 μm. From this result, the mean thickness of the hot-melt adhesive resin layer was claculated to be 0.22 μm. A uniform layer of carboxyl group-containing ethylenevinyl acetate copolymer had been formed on the surfaces of the inorganic particles.

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the particulate spacers.

EXAMPLE 10

First, 10 g of short glass fibers with mean diameter 9.05 μm and mean length 15.1 μm, composed of borosilicate glass, was added to a solution prepared by dissolving 0.3 g of tetrakis(2-ethylhexoxy)titanium in 15 ml of n-hexane, and the ingredients were well mixed with a spatula, after which the n-hexane was evaporated. Next, this mixture was thoroughly ground in a mortar, eliminating the lumps.

Then, 3.5 g of oxidized waxy polyethylene was added to 50 ml of toluene and dissolved by warming in a hot water bath at 80° C. On the other hand, a surfactant solution was prepared by dissolving 0.5 g of the surfactant (NOIGEN EA120) in 300 ml of water. The aforesaid oxidized waxy polyethylene solution was added to this surfactant solution, and the mixture was emulsified by agitation, while maintaining the temperature at 80° C.

The short glass fibers treated with the organic titanate compound were then added to this emulsion, and while thoroughly dispersing and suspending the fibers, the temperature was reduced to 45° C. by cooling at the rate of 0.2° per minute, following which 200 ml of ethanol was added. This suspension was filtered with a glass filter (G14), and the material separated was then thoroughly washed with methanol, after which separation and purification were performed by the same procedure as that used in Example 8.

The mean diameter of the particulate spacers so obtained was 9.45 μm. From this results, the mean thickness of the hot-melt adhesive resin layer formed on the surfaces of the short glass fibers was calculated to be 0.2 μm.

EXAMPLE 11

First, 10 g of resin particles with mean particle size 9.90 μm (standard deviation 0.36 μm), consisting of a divinylbenzene polymer, was added to a solution prepared by dissolving 0.15 g of tetrapropoxytitanium in 15 ml of n-hexane, and the ingredients were well mixed with a spatula, after which the n-hexane was evaporated. Next, this mixture was thoroughly ground in a mortar, eliminating the lumps.

Next, 2 g of epoxy resin (EPICOAT 1001) was dissolved in 40 ml of acetone, and to this solution was added 6 ml of water, 10 g of the aforesaid resin particles, and as a hardening agent, 0.4 g of 2-ethyl-4-methylimidazole. After thorough mixing, the acetone was evaporated, while stirring. Then, the dried material was crushed in a mortar and the lumps were completely demolished.

The mean particle size of the particulate spacers so obtained was 10.32 μm (standard deviation 0.46 μm). From this result, the mean thickness of the adhesive epoxy resin layer was calculated to be 0.21 μm. Examination of the surfaces of these particulate spacers revealed that the colored resin particles has indeed been uniformly coated with epoxy resin.

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the particulate spacers. Furthermore, the retention ratio of the particulate spacers was 0.95.

EXAMPLE 12

First, 10 g of inorganic particles with mean particle size 7.30 μm (standard deviation 0.32 μm), composed of borosilicate glass, was added to a solution prepared by dissolving 0.35 g of tetrakis(2-ethylhexoxy)titanium in 15 ml of n-hexane, and the ingredients were well mixed with a spatula, after which the n-hexane was evaporated.

Next, this mixture was thoroughly ground in a mortar, eliminating the lumps.

Then, 0.2 g of dicyandiamide and 0.2 g of 2-phenylimidazole-4,5-diyldimethanol were used as hardening agents.

Except for the use of the aforesaid materials, particulate spacers were then prepared by the same procedure as that used in Example 11.

The mean particle size of the particulate spacers so obtained was 7.76 μm (standard deviation 0.35 μm). The mean thickness of the epoxy resin adhisive layer was 0.23 μm. The dispersibility of these particulate spacers was tested, and the results showed that the particulate spacers could be well dispersed in the form of single particles on glass plates. Also, tests of the adhesion of the particulate spacers to the glass plate indicate that fused resin material was present between the glass plate and the particulate spacers. Furthermore, the retention ratio of the particulate spacers was 0.90.

EXAMPLE 13

First, 10 g of short glass fibers with mean diameter 9.05 μm and mean length 45.3 μm, composed of borosilicate glass, was added to a solution prepared by dissolving 0.3 g of tetrakis(2-ethylhexoxy)titanium in 15 ml of n-hexane, and the ingredients were well mixed with a spatula, after which the n-hexane was evaporated. Next, this mixture was thoroughly ground in a mortar, eliminating the lumps.

Then, 0.4 g of 1-cyanoethyl-2-ethyl-4-methylimidazole was used as a hardening agent.

Other than the aforesaid items, glass fibers were then obtained by the same process as that employed in Example 11.

The mean diameter of the glass fibers so obtained was 9.40 μm and the means thickness of the adhesive epoxy resin layer was calculated to be 0.175 μm. The dispersibility of these glass fibers was tested, and the results showed that the glass fibers could be well dispersed in the form of single glass fibers on glass plates. Also, tests of the adhesion of the glass fibers to the glass plate indicated that fused resin material was present between the glass plate and the glass fibers. Furthermore, the retention ratio of the glass fibers was 1.0.

EXAMPLE 14

(A) Preparation of colored resin particles

First, 100 g of concentrated sulfuric acid was added to 10 g of plastic particles 8.05 μm in size, which were polymer particles prepared by polymerizing divinylbenzene, and acid treatment was continued, while stirring for 6 hours at 55° C. On the other hand, 6 g of a basic dye (CATIRON BLACK SBH) was added to 300 ml of water, and a dye bath solution was obtained by adjusting this solution to pH 4 with acetic acid. Then, the aforesaid acid-treated resin particles were added to this dye bath solution, and dyeing treatment was performed for 6 hours at 95° C., thereby obtaining 10 g of black-colored resin particles. The mean particle size of these colored particles was 8.45 μm.

(B) Preparation of particulate spacers

A waxy polyethylene solution was prepared by adding 10.0 g of waxy polyethylene (SANWAX 151-P) to 200 ml of toluene and dissolving the wax by warming in a hot water bath at 80° C.

On the other hand, a surfactant solution was prepared by dissolving 1.5 g of the surfactant (NOIGEN EA120) in 950 ml of water. The aforesaid waxy polyethylene solution was then added to this surfactant solution, and the mixture was emulsified by agitation, while maintaining the temperature at 80° C.

Next, 10 g of the colored resin particles obtained as described in item (A) above was added to this emulsion. After thorough suspension and dispersion, the temperature of the mixture was reduced to 45° C. by cooling at the rate of 0.1° C./min. Stirring was continued throughout this procedure. This emulsion was filtered with a glass filter (G-4). The material separated was thoroughly washed with methanol and then suspended in 3 liters of a mixed ethanol/Freon-113 solution (volume ratio 2:1). The mixture was then left standing undisturbed in that state for 15 hours and the supernatant was decanted to remove minute flakes of waxy polyethylene. The remaining material was again filtered on a glass filter, then washed with Freon-113 and dried at room temperature under reduced pressure, thereby obtaining the final particulate spacers.

(C) Measurement of physical properties of particulate spacers

The mean particle size of these particulate spacers was 8.92 μm, and the mean thickness of the waxy polyethylene layer was therefore calculated to be 0.20 μm. Examination of the surfaces of these particulate spacers revealed that the colored resin particles had indeed been uniformly coated with waxy polyethylene.

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the particulate spacers.

EXAMPLE 15

(A) Preparation of colored resin particles 30 Here, 10 g of blue-colored resin particles were obtained by dyeing silica particles with mean particle size 1.15 μm (SEAHOSTAR KE-P1OO) with a basic dye.

(B) Preparation of particulate spacers

First, 10 g of the aforesaid colored particles were added to a solution prepared by adding 9.0 g of a carboxyl group-containing ethylene-vinyl acetate copolymer (DUMILAN C-2280) to 600 ml of toluene and warming in a hot water bath at 60° C. After thorough dispersion and suspension of the resin particles, ethanol was added dropwise the mixture at the rate of 0.5 ml/min until a total of 350 ml of ethanol had been added thereto. Then, the mixture was cooled to room temperature, filtered on a glass filter (G-4) and washed with ethanol. Next, the material separated was suspended in 2.5 liters of a mixed ethanol/Freon-113 solution (volume ratio 2:1). The mixture was then left standing undisturbed in this state for 15 hours, and the supernatant was decanted to remove suspended fragments of carboxyl group-containing ethylene-vinyl acetate copolymer. The remaining material was again filtered on a glass filter, then washed with Freon-113, and vacuum-dried at room temperature, thereby obtaining the final particulate spacers. The mean particle size of these particulate spacers was 1.27 μm, and the mean thickness of the hotmelt adhesive resin layer was calculated to be 0.03 μm. Examination of the particulate spacers revealed that a uniform layer of hot-melt resin had been formed on the surfaces of the colored particles.

(C) Measurement of physical properties of particulate spacers

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the particulate spacers.

EXAMPLE 16

(A) Preparation of colored resin particles

Here, 10 g of red-colored resin particles was obtained by dyeing melamine resin particles 20.27 μm in size (UNIVEKS WA, manufactured by Unitika, Ltd.).

(B) Preparation of particulate spacers

First, 10.5 g of oxidized waxy polyethylene (SANWAX E-300) was added to 150 ml of toluene and dissolved by warming in a hot water bath at 80° C. On the other hand, a surfactant solution was prepared by dissolving 1.5 g of the surfactant (NOIGEN EA120) in 1 liter of water. The aforesaid oxidized waxy polyethylene solution was then added to this surfactant solution, and the mixture was emulsified by agitation, while maintaining the temperature at 80° C.

Next, 10 g of the aforesaid colored resin particles was added to this emulsion. While vigorously dispersing and suspending the resin particles, the temperature of the mixture was reduced to 45° C. by cooling at the rate of 0.2° C./min, after which 700 ml of ethanol was added thereto. Then, this emulsion was filtered with a glass filter (G-4) and thoroughly washed with methanol, after which separation and purification were performed in the same manner as described in Example 14.

(C) Measurement of physical properties of particulate spacers

The mean particle size of these particulate spacers so obtained was 21.27 μm, and the mean thickness of the hot-melt adhesive resin layer was calculated to be 0.50 μm. Examination of the surfaces of these particulate spacers revealed that the colored resin particles had indeed been uniformly coated with hot-melt adhesive resin. The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the particulate spacers. Furthermore the retention ratio of the particulate spacers was 1.0.

EXAMPLE 17

(A) Preparation of colored resin particles having a titanium oxide polymer intermediate layer on the surface thereof First, 10 g of colored resin particles prepared by the same procedure as that described in Example 14 were added to a solution prepared by dissolving 0.15 g of tetrapropoxytitanium (A-1) in 15 ml of n-hexane, and the ingredients were well mixed with a spatula, after which the n-hexane was evaporated. Next, this mixture was thoroughly ground in a mortar, eliminating the lumps. The mean particle size of the colored resin particles so coated with titanium oxide polymer was 8.84 μm.

(B) Preparation of particulate spacers

A waxy polyethylene solution was prepared by adding 2.6 g of waxy polyethylene (SANWAX 151-P) to 50 ml of toluene and dissolving the waxy polyethylene by warming in a hot water bath at 80° C.

On the other hand, a surfactant solution was prepared by dissolving 0.5 g of the surfactant (NOIGEN EA120) in 300 ml of water. The aforesaid solution of waxy polyethylene was then added to this surfactant solution, and the mixture was emulsified by agitation, while maintaining the temperature at 80° C.

Next, 10 g of the colored resin particles coated with titanium oxide polymer, which had been obtained as described in item (A) above, was added to this emulsion. After thorough suspension and dispersion, the temperature of the mixture was reduced to 45° C. by cooling at the rate of 0.1° C./min. Stirring was continued throughout this procedure. This emulsion was filtered with a glass filter (G-4). The material separated was thoroughly washed with methanol and then suspended in 1 liter of a mixed ethanol/Freon-113 solution (volume ratio 2:1). The mixture was then left standing undisturbed in that state for 15 hours and the supernatant was decanted to remove minute flakes of waxy polyethylene. The remaining material was again filtered on a glass filter, then washed with Freon-113 and dried at room temperature under reduced pressure, thereby obtaining the final particulate spacers.

(C) Measurement of physical properties of particulate spacers

The mean particle size of these particulate spacers was 8.97 μm, and the mean thickness of the waxy polyethylene layer was therefore calculated to be 0.21 μm. Examination of the surface of these particulate spacers revealed that the colored resin particles having a titanium oxide polymer intermediate layer on the surface thereof had indeed been uniformly coated with waxy polyethylene.

The dispersibility of these particulate spacers was tested, the results showed that the particulate spacers could be well dispersed in the form of single particles on glass plates. Also, tests of the adhesion of the particulate spacers to the glass plate indicated that fused resin material was present between the glass plate and the colored resin particles having a titanium oxide polymer intermediate layer on the surface thereof. Furthermore, the retention ratio of the particulate spacers was 1.0.

EXAMPLE 18

(A) Preparation of colored particles having a titanium oxide polymer intermediate layer on the surface thereof First, 10 g of blue-colored particles prepared by the same procedure as that described in Example 15 were added to a solution prepared by dissolving 0.35 g of tetrabutoxytitanium (B-1) in 15 ml of n-hexane, and the ingredients were well mixed with a spatula, after which the n-hexane was evaporated. Next, this mixture was thoroughly ground in a mortar, eliminating the lumps.

(B) Preparation of particulate spacers

First, 2.9 g of a carboxyl group-containing ethylene-vinyl acetate copolymer (DUMILAN C-2280) was added to 200 ml of toluene and dissolved by warming in a hot water bath at 60° C. The aforesaid colored resin particles coated with titanium oxide polymer were added to this solution. After thorough dispersion and suspension, ethanol was added dropwise the mixture at the rate of 0.5 ml/min, and this procedure was continued until 120 ml of ethanol had been added thereto. Then, after cooling down to room temperature, the mixture was filtered with a glass filter (G-4). The material separated was then washed with ethanol and suspended in 1 liter of a mixed ethanol/Freon-113 solution (volume ratio 2:1). The mixture was then left standing undisturbed in this state for 15 hours, and the supernatant was decanted to remove suspended fragments of carboxyl group-containing ethylene-vinyl acetate copolymer. The remaining material was again filtered on a glass filter, then washed with Freon-113, and vacuum-dried at room temperature, thereby obtaining the final particulate spacers. The mean particle size of these particulate spacers was 1.23 μm, and the mean thickness of the hot-melt adhesive resin layer was calculated to be 0.04 μm. Examination of the surfaces of the particulate spacers revealed that a uniform layer of hot-melt adhesive resin had been formed on the surfaces of the colored particles having a titanium oxide polymer intermediate layer.

(C) Measurement of physical properties of particulate spacers

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the colored particles having a titanium oxide polymer intermediate layer.

EXAMPLE 19

(A) Preparation of colored resin particles

First, 10 g of red-colored resin particles obtained by the same process as that used in Example 16 was added to a solution prepared by dissolving 0.3 g of tetrakis(2-ethylhexoxy)titanium in 15 ml of n-hexane, and the ingredients were well mixed with a spatula, after which the n-hexane was evaporated. Next, this mixture was thoroughly ground in a mortar, eliminating the lumps.

(B) Preparation of particulate spacers

First, 10.5 g of oxidized waxy polyethylene (SANWAX E-300) was added to 150 ml of toluene and dissolved by warming in a hot water bath at 80oC. On the other hand, a surfactant solution was prepared by dissolving 1.5 g of the surfactant (NOIGEN EA120) in 1 liter of water. The aforesaid oxidized waxy polyethylene solution was then added to this surfactant solution, and the mixture was emulsified by agitation, while maintaining the temperature at 80° C.

Next, 10 g of the aforesaid colored resin particles was added to this emulsion. While vigorously dispersing and suspending the resin particles, the temperature of the mixture was reduced to 45° C. by cooling at the rate of 0.2° C./min, after which 700 ml of ethanol was added thereto. Then, this emulsion was filtered with a glass filter (G-4) and thoroughly washed with methanol, after which separation and purification were performed in the same manner as described in Example 14.

(C) Measurement of physical properties of particulate spacers

The mean particle size of the particulate spacers so obtained was 21.30 μm, and the mean thickness of the hot-melt resin layer was calculated to be 0.52 μm. Examination of the surfaces of these particulate spacers revealed that the colored resin particles had indeed been uniformly coated with hot-melt adhesive resin.

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the colored resin particles.

EXAMPLE 20

(A) Preparation of colored resin particles

Here, 10 g of black-colored resin particles were obtained in accordance with the procedure as described in item (A) of Example 14. The mean particle size of these colored resin particles was 8.45 μm.

(B) Preparation of particulate spacers

First, 2 g of solid epoxy (EPICOAT 1001) with epoxy equivalent 480 and softening point 68° C. was dissolved in 40 ml of acetone, after which 6 ml of water, 10 g of the aforesaid colored resin particles and 0.4 g of 2-ethyl-4-methylimidazole (CUREZOL 2E4MZ) as a hardening agent were added thereto. After thorough mixing, the acetone was evaporated by stirring. Next, the dry material so obtained was thoroughly crushed in a mortar, completely demolishing the lumps.

The mean particle size of the particulate spacers so obtained was 8.45 μm. From this result, the mean thickness of the epoxy resin layer was calculated to be 0.20 μm. Examination of the surfaces of these particulate spacers revealed that a uniform layer of epoxy resin had been formed on the colored resin particles.

(C) Measurement of physical properties of particulate spacers

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the colored resin particles. The retention rate of the particulate spacers was 0.95.

EXAMPLE 21

(A) Preparation of colored particles

Here, 10 g of blue-colored particles were obtained in accordance with the procedure as described in item (A) of Example 15.

(B) Preparation of particulate spacers

First, 0.2 g of dicyandiamide (DICY-7) and 0.2 g of 2-phenylimidazole-4,5-diyldimethanol (2PHZ) were used as hardening agents.

Particulate spacers were obtained by the same procedure as that employed in Example 20, except for the use of the aforesaid materials. The mean particle size of these particulate spacers was 1.35 μm, while the mean thickness of the epoxy resin layer was calculated to be 0.10 μm. Examination of the surfaces of these particulate spacers revealed that a uniform layer of epoxy resin had been formed on the colored particles.

(C) Measurement of physical properties of particulate spacers

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the colored resin particles. The retention rate of the particulate spacers was 0.95.

EXAMPLE 22

(A) Preparation of colored resin particles

Here, 10 g of red-colored particles were obtained in accordance with the procedure as described in item (A) of Example 16.

(B) Preparation of particulate spacers

First, 0.4 g of 1-cyanoethyl-2-ethyl-4-methylimidazole (2E4MZ-CN) was used as a hardening agent.

Particulate spacers were obtained by the same procedure as that employed in Example 20, except for the use of the aforesaid materials. The mean particle size of these particulate spacers was 20.93 μm, while the mean thickness of the epoxy resin layer was calculated to be 0.33 μm. Examination of the surfaces of these particulate spacers revealed that a uniform layer of epoxy resin had been formed on the colored resin particles.

(C) Measurement of physical properties of particulate spacers

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the colored resin particles. The retention rate of the particulate spacers was 1.0.

EXAMPLE 23

(A) Preparation of colored resin particles having a titanium oxide polymer intermediate layer on the surface thereof First, 10 g of colored resin particles obtained by the same process as that used in Example 20 was added to a solution prepared by dissolving 0.15 g of tetrapropoxytitanium (A-1) in 15 ml of n-hexane, and the ingredients were well mixed with a spatula, after which the n-hexane was evaporated.

Next, this mixture was thoroughly ground in a mortar, eliminating the lumps.

(B) Preparation of particulate spacers

First, 2 g of solid epoxy (EPICOAT 1001) with epoxy equivalent 480 and softening point 68° C. was dissolved in 40 ml of acetone, after which 6 ml of water, 10 g of the aforesaid colored resin particles coated with titanium oxide polymer and 0.4 g of 2-ethyl-4- methylimidazole (CUREZOL 2E4MZ) as a hardening agent were added thereto. After thorough mixing, the acetone was evaporated while stirring. Next, the dry material so obtained was thoroughly crushed in a mortar, completely demolishing the lumps.

The mean particle size of the particulate spacers so obtained was 8.84 μm, and the mean thickness of the epoxy resin layer was calculated to be 0.40 μm. Examination of the surfaces of these particulate spacers revealed that a uniform layer of epoxy resin had been formed on the colored resin particles having a titanium oxide polymer intermediate layer on the surface thereof.

(C) Measurement of physical properties of particulate spacers

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the colored resin particles having a titanium oxide polymer intermediate layer on the surface thereof. The retention rate of the particulate spacers was 1.0.

EXAMPLE 24

(A) Preparation of colored particles having a titanium oxide polymer intermediate layer on the surface thereof First, 10 g of blue-colored particles obtained by the same process as that used in Example 21 was added to a solution prepared by dissolving 0.35 g of tetrabutoxytitanium (B-1) in 15 ml of n-hexane, and the ingredients were well mixed with a spatula, after which the n-hexane was evaporated.

Next, this mixture was thoroughly ground in a mortar, eliminating the lumps.

(B) Preparation of particulate spacers

On the other hand, 2 g of solid epoxy (EPICOAT 1001) with epoxy equivalent 480 and softening point 68° C. was dissolved in 40 ml of acetone, after which 6 ml of water, 10 g of the aforesaid colored particles coated with titanium oxide polymer, and as hardening agents, 0.2 g of dicyanamide (DICY-7) plus 0.2 g of 2-phenylimidazole-4,5-di-yl-dimethanol (2PHZ) were added to the solution. After thorough mixing, the acetone was evaporated while stirring. Next, the dry material so obtained was thoroughly crushed in a mortar, completely demolishing the lumps and obtaining the final particulate spacers.

The mean particle size of the particulate spacers was 1.32 μm, and the mean thickness of the epoxy resin layer was calculated to be 0.09 μm. Examination of the surfaces of these particulate spacers revealed that a uniform layer of epoxy resin had been formed on the colored particles having a titanium oxide polymer intermediate layer on the surface thereof.

(C) Measurement of physical properties of particulate spacers

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the colored resin particles having a titanium oxide polymer intermediate layer on the surface thereof. The retention rate of the particulate spacers was 0.95.

EXAMPLE 25

(A) Preparation of colored resin particles having a titanium oxide polymer intermediate layer on the surface thereof First, 10 g of red-colored particles obtained by the same process as that used in Example 22 was added to a solution prepared by dissolving 0.3 g of tetrakis(2-ethylhexoxy)titanium (TOT) in 15 ml of n-hexane, and the ingredients were well mixed with a spatula, after which the n-hexane was evaporated. Next, this mixture was thoroughly ground in a mortar, eliminating the lumps.

(B) Preparation of particulate spacers

Here, 0.4 g of 1-cyanoethyl-2-ethyl-4-methylimidazole (2E4MZ-CN) was used as a hardening agent.

Particulate spacers were obtained by the same procedure as that employed in Example 20, except for the use of the aforesaid materials. The mean particle size of these particulate spacers was 20.77 μm, while the mean thickness of the epoxy resin layer was calculated to be 0.22 μm. Examination of the surfaces of these particulate spacers revealed that a uniform layer of epoxy resin had been formed on the colored resin particles having a titanium oxide polymer intermediate layer on the surface thereof.

(C) Measurement of physical properties of particulate spacers

The dispersibility of these particulate spacers was tested, and the results showed that the particulate spacers could be well dispersed in the form of single particles on glass plates. Also, tests of the adhesion of the particulate spacers to the glass plate indicated that fused resin material was present between the glass plate and the colored resin particles having a titanium oxide polymer intermediate layer on the surface thereof. The retention rate of the particulate spacers was 0.99.

EXAMPLE 26

Hot-melt type particulate spacers were obtained by covering divinylbenzene polymer particles of mean particle size 10.05 μm (standard deviation 0.35 μm) with a 0.2 μm-thick layer of carboxyl group-containing ethylene-vinyl acetate copolymer (DUMILAN C-2280).

A glass substrate of thickness 1.2 mm was obtained by forming an ITO electrode on one face of this glass plate, and the aforesaid particulate spacers were sprayed onto the glass substrate so as to distribute the particulate spacers with a surface density of 150 particles per square millimeter.

A pressing plate was prepared by coating polytetrafluoroethylene onto a steel plate 3 mm in thickness. This pressing plate was placed onto the glass substrate upon which the aforesaid particulate spacers had been distributed. Thereafter, using a hot press, the pressing plate and glass substrate were uniformly pressed together for 15 minutes at a temperature of 160° C. and a pressure of 3 kg/cm². Then, the glass substrate and pressing plate were removed from the hot press, following which the both were again pressed together for 15 minutes with a cold press under a pressure of 3 kg/cm².

The glass substrate and the pressing plate were then removed from the cold press, and the pressing plate was detached from the glass substrate. Examination of the state of adhesion of the particulate spacers on the glass substrate with a microscope at a magnification of 200× revealed that almost all the particulate spacers had adhered to the glass substrate, and were not adhering to the pressing plate.

Next, another glass substrate of the same dimensions as the aforesaid glass substrate was prepared, and an epoxy resin adhesive agent was applied by screen printing to the periphery of this other substrate with a width of 1 mm and a thickness of 15 μm, excepting an orifice for the injection of liquid crystal material. This substrate was then superimposed upon the previously mentioned glass substrate, and the both were pressed together by means of a hot press at a temperature of 170° C. and a pressure of 5 kg/cm² for 30 minutes, thereby hardening the adhesive agent. Next, a nematic liquid crystal was injected through the aforesaid injection orifice, which was then sealed with a sealing material, thereby obtaining a liquid crystal display panel.

The width of the gap between the electrodes in the liquid crystal display cell formed from a pair of glass substrates by the present procedure was determined using a liquid crystal cell gap measuring apparatus (Model TFM-120AFT, manufactured by OAK SEISAKUSHO CO., Ltd.), and was found to be 10.0 μm. This indicated that the dimensional precision of the gap between the pair of glass substrates assembled in this manner is within 0.1 μm.

Also, the liquid crystal display cell obtained in the aforesaid manner was subjected to continued vibration for a period of 50 hours with a vibration testing apparatus (20 Hz, amplitude 2 mm), after which the displacement of the aforesaid particulate spacers from their original sites of adhesion was investigated by microscopic observation. No signs of displacement of the particulate spacers were observed.

EXAMPLE 27

Particulate spacers were obtained by covering divinylbenzene polymer particles of mean particle size 9.02 μm (standard deviation 0.04 μm) with a 0.2 μm-thick layer of an adhesive agent composed of an epoxy resin (EPICOAT 1001) and the hardening agent 2-ethyl-4-methylimidazole (CUREZOL 2E4MZ).

A plastic substrate was prepared by forming an ITO electrode on one face of a polyethersulphone sheet of thickness 100 μm and area 8 cm×4 cm. The aforesaid particulate spacers were sprayed onto this substrate so as to distribute the particulate spacers with a surface density of 50 particles per square millimeter.

Then, the particulate spacers were pressed onto the substrate with a pressing plate in the same manner as described in Example 26, except that in the present case the pressure applied with the pressing plate was 1.5 kg/cm². This resulted in excellent adhesion of the particulate spacers to the substrate.

Next, the second substrate of the same dimensions as the aforesaid substrate was prepared, and an epoxy resin adhesive agent was applied to the periphery of this other substrate, excepting an orifice for the injection of liquid crystal material which was then superimposed upon the previously mentioned substrate, and the both were pressed together by means of a hot press at a temperature of 170° C. and a pressure of 2.5 kg/cm² for 30 minutes, thereby hardening the adhesive agent. Next, a nematic liquid crystal was injected through the aforesaid injection orifice, which was then sealed with a sealing material thereby obtaining a liquid crystal display panel.

The width of the gap between the electrodes in the liquid crystal display cell formed from the pair of substrates by the present procedure was found to be within the range 8.7±0.2 μm.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A particulate spacer comprising a core particle having a surface, a functional layer formed on the surface of said core particle and an intermediate layer made of titanium oxide polymer, said intermediate layer being disposed between the surface of said core particle and the functional layer.

2. A particulate spacer according to claim 1, wherein said functional layer is made of a hot-melt adhesive resin.

3. A particulate spacer according to claim 1, wherein said functional layer is made of an epoxy resin.

4. A particulate spacer according to claim 1, wherein said core particle is colored.

5. A particulate spacer comprising a core particle having a surface and a functional layer formed on the surface of said core particle,
wherein said core particle is made of a cross-linked resin which is prepared from a monomer mixture containing ethylenically unsaturated monomers, said monomer mixture including 5 percent by weight of ethylenically unsaturated monomer containing at least two ethylenically unsaturated groups, based on the total weight of said monomer mixture.

6. A particulate spacer according to claim 5, wherein said ethylenically unsaturated monomer containing at least two ethylenically unsaturated moieties is at least one selected from the group consisting of x-methylolalkyl y-(meth)acrylates (where x and y are integers satisfying the condition $x \geq y \geq 2$), polyoxyalkylene glycol di(meth)acrylates, triallyl (iso)cyanurate, triallyl trimellitate, divinylbenzene, diallyl phthalate, and diallyl acrylamide.

7. A liquid crystal display cell comprising:
a pair of opposing substrates, at least one of which is transparent, each substrate having a surface facing the opposing substrate, a peripheral portion therebetween, and each substrate having an electrode on the surface, said substrates being disposed at a constant gap;
a sealing material filling the peripheral portion of the gap between the substrates;
particulate spacers disposed in the gap space between the substrates to maintain a constant gap between the substrates, each of said particulate spacers including a core particle having a surface, a functional layer formed on the surface of said core particle and an intermediate layer made of titanium oxide polymer, said intermediate layer being disposed between the surface of said core particle and the functional layer; and
a liquid crystal composition filling the gap between the substrates.

8. A liquid crystal display cell according to claim 7, wherein said functional layer formed on the surface of said core particle is made of a hot-melt adhesive resin.

9. A liquid crystal display cell according to claim 7, wherein said functional layer formed on the surface of said core particle is made of an epoxy resin.

10. A liquid crystal display cell comprising:

a pair of opposing substrates, at least one of which is transparent, each substrate having a surface facing the opposing substrate, a peripheral portion therebetween, and an electrode on the surface, said substrates being disposed at a constant gap;

a sealing material filling the peripheral portion of the gap between the substrates;

particulate spacers disposed in the gap space between the substrates to maintain a constant gap between the substrates, each of said particulate spacers including a core particle having a surface and a functional layer formed on the surface of said core particle, wherein said core particle is made of a cross-linked resin which is prepared from a monomer mixture containing ethylenically unsaturated monomers, said monomer mixture including 5 per cent by weight of ethylenically unsaturated monomer containing at least two ethylenically unsaturated groups, based on the total weight of said monomer mixture; and a liquid crystal composition filling the gap between the substrates.

* * * * *